No. 715,854. Patented Dec. 16, 1902.
P. PATTERSON.
APPARATUS FOR THE MANUFACTURE OF BUTT WELD TUBING.
(Application filed Oct. 5, 1900. Renewed Apr. 21, 1902.)
(No Model.)
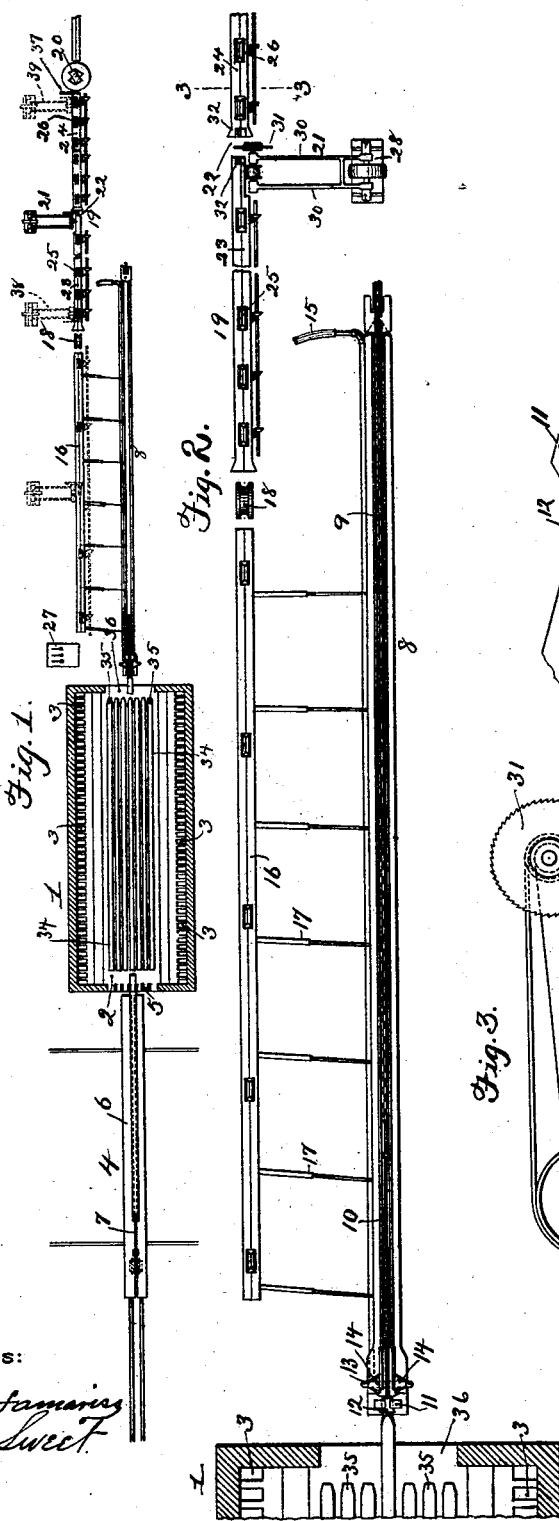
Witnesses:
Inventor:

UNITED STATES PATENT OFFICE.

PETER PATTERSON, OF McKEESPORT, PENNSYLVANIA, ASSIGNOR TO NATIONAL TUBE COMPANY, OF NEW YORK, N. Y., A CORPORATION OF NEW JERSEY.

APPARATUS FOR THE MANUFACTURE OF BUTT-WELD TUBING.

SPECIFICATION forming part of Letters Patent No. 715,854, dated December 16, 1902.

Application filed October 5, 1900. Renewed April 21, 1902. Serial No. 103,916. (No model.)

*To all whom it may concern:*

Be it known that I, PETER PATTERSON, a resident of McKeesport, in the county of Allegheny and State of Pennsylvania, have invented a new and useful Improvement in Apparatus for the Manufacture of Butt-Weld Tubing; and I do hereby declare the following to be a full, clear, and exact description thereof.

My invention relates to the manufacture of butt-weld tubing; and its object is to provide apparatus for forming more than a single standard length of tubing at one operation.

My invention is designed for and is especially applicable to the manufacture of butt-weld tubing from flat strips or plates, and I will describe it in connection therewith; but it is to be understood that it is not limited thereto, but may be used in the manufacture of butt-weld tubing from any suitable tube-blanks, such as U-shaped or like tubular blanks.

As tube-welding operations have heretofore been carried on the most approved practice has been to charge tube-blanks in the form of flat plates or strips of metal of a length sufficient to form a single welded tube of standard length through the rear end of the furnace into the furnace-chamber, permitting the strips to rest in the position in which they were charged, and when they were at the proper heat to grasp the end of each strip with tongs or like pipe-drawing tool and connect the same to drawing apparatus, and thereby draw the strip when its edges were at a high welding heat through a welding-bell, as described in Letters Patent No. 581,251, granted to me April 20, 1897. The welded tube was then passed through what are termed "sizing-rolls" to bring it to substantially the same diameter throughout its length and then through finishing-rolls, in which the blank was rotated as it was fed forward to smooth its surface and to bring it to true cylindrical form. The strips employed were somewhat shorter than the finished tube, being generally sixteen to eighteen (16 to 18) feet in length and forming finished tubes from eighteen to twenty (18 to 20) feet in length, and after the tubes were finished the end portions thereof were cut off, the metal at each end of a standard tube being thus wasted and forming scrap.

The several manipulations above described are necessary with each length of standard tube produced, and as time is lost in each operation and part of the heat of the furnace wasted after the withdrawal of the heated blank and before the charging of a fresh blank it is evident that any means by which the number of manipulations of the tube can be reduced will effect a corresponding saving in the cost of tubing. In an application of even date herewith, Serial No. 32,132, I have described and claimed a method of forming such butt-weld tubing by introducing into the furnace-chamber a blank of sufficient length to form two or more tubes of standard length, raising its edges to a welding heat, drawing it through a welding-bell, and thereby welding it into tubing, and while the tube is still at a rolling heat dividing it into lengths and finishing each length separately, the method also including such cooling of the tube as fast as it is welded as will prevent the undue stretching of the tube under the strain of the drawing process.

The present invention, which is intended to provide apparatus for the practice of said method and generally to improve apparatus suitable for butt-welding practice, consists, broadly stated, in the combination, with the welding-furnace and draw-bench in front thereof, of a receiving-trough at the side of the draw-bench and in line with finishing-rolls, a saw adapted to pass across the receiving-trough and cut the tube into lengths, and means for feeding the tube forward into the finishing-rolls.

It also consists in means for applying the cooling medium to the welded portion of the tube, and embraces other improvements, as hereinafter more fully set forth and claimed.

To enable others skilled in the art to make and use my invention, I will describe the same more fully in connection with the accompanying drawings, in which—

Figure 1 is a plan view of a plant embodying the invention, with the top of the furnace removed. Fig. 2 is an enlarged plan view of the preferred form of apparatus, including the draw-bench, receiving-trough, and finishing-rolls. Fig. 3 is a cross-section on the line 3 3, Fig. 2, illustrating the saw construction. Fig. 4 is a perspective view of the forward end of the draw-bench, illustrating the means for applying the air-blast to the welded portion of the tube.

The furnace 1 illustrated in the drawings is a suitable welding-furnace having a heating-space practically double the length of the ordinary furnace now in use. In actual practice the furnace would be about thirty-eight to forty-one (38 to 41) feet in length and have a hearth 2 of sufficient width to receive six or more blanks to be welded into tubing, which blanks are shown as flat plates or strips, the furnace being arranged to be heated by gas, the gas and air ports 3 being located at the sides of the hearth. The strips, which are of double the usual length, may be fed to the furnace either manually or by suitable charging apparatus—such, for example, as that shown at 4—which is arranged to be reciprocated transversely of the furnace-chamber, across the end thereof, and opposite the charging-openings 5 and which has a flat top or table 6 to receive the strips and a pushing-arm 7 for pushing them into the furnace. At the opposite end of the furnace is located any suitable drawing apparatus 8, the one shown being a draw-bench adapted to reciprocate either on parallel lines or to swing from a fixed point at its outer end across the front of the furnace and having a continuously-running draw-chain 9, with which the tongs 10 or other suitable tube-drawing tools are connected during the operation of drawing and welding the tube, the draw-bench being made of sufficient length to draw the double-length strip through the welding-bell. The draw-bench 8 carries at its forward end the bell-holder 11, adapted to hold the welding-bell 12.

On account of the great length of the tube formed and the friction of the welding-bell on the strip being welded there is liability that such great length of welded tube, if permitted to retain the high welding heat, will stretch before the strip is entirely welded into tubing. For some sizes of tubing and thicknesses of metal it is designed to cool the welded portion of the tube sufficiently to prevent such stretching. While it is thus to be cooled, however, it is necessary that it shall not be permitted to fall below a sufficient rolling temperature for the finishing of the tube. Hence the cooling medium must be so applied that while it will fairly stiffen the work it will not overchill it or reduce it below a suitable rolling heat. It is also important that it shall cool the tube to the same extent throughout its length, and for this purpose I place the jet mechanism 13 in position to project the cooling medium against the welded portion of the tube back of the bell-holder 11, but close to the same, so that as soon as any portion of the tube is welded it is carried past such jet mechanism and cooled by the cooling medium projected against it. I prefer to employ regular air-blast pipes for this purpose, and I have shown in the drawings the air-blast pipes 13, supported on the draw-bench and extending up to the level of the course of the tube on each side thereof, back of but close to the bell-holder. The blast-pipes have spreading nozzles 14 to distribute the air for some distance along the course of the passing tube, and so act to reduce its temperature and stiffen it sufficiently to prevent its undue stretching during the welding of the remainder of the strip. The air under pressure may be carried to the blast-pipes through any suitable flexible hose connection 15, the air-blast pipes being supported on the draw-bench and traveling with it. Where a swinging draw-bench is used, the hose connection 15 may be made at its rear end, and the air-supply pipe 13 may extend forward along the bench to the nozzles. Instead of the air-blast a water-jet or other suitable cooling medium may be applied to the tubes, as found most desirable.

Located at the side of the draw-bench is the trough 16, into which the operator delivers the welded tube. The trough 16 is connected with the draw-bench by suitable telescoping guides 17 and is of sufficient length to receive the full length of the tube welded at one time. The extra long tube so formed can either be cut to the standard lengths when in the trough 16, which leads to the sizing-rolls 18, or when in the trough 19, which receives it from the sizing-rolls and leads it to the finishing-rolls 20. I prefer to locate the saw 21 for cutting the tube into lengths in the trough 19 and have illustrated it in full lines in connection with said trough and in dotted lines with the trough 16. The sizing-rolls 18 are a pair of ordinary direct-acting concave rolls adapted to receive the tube and roll it to even diameter and deliver it into the trough 19. Midway of this trough is located the saw 21, which is arranged to travel across the course of the trough 19 and cut the tube into lengths, the trough 19 having a slot 22 for the passage of the saw and being thus divided into two sections 23 and 24, so that the tube as it lies in the trough may be cut into two standard lengths. The finishing-rolls 20 preferred are diagonal cross-rolls adapted to both rotate the pipe and feed it forward, and in so doing both to smooth its surface and bring it to proper cylindrical shape. The sections of tubes formed from the extra long welded tube delivered into the trough 19 are successively fed forward into the cross-rolls by means of the sets 25 and 26 of driven rollers arranged in the troughs 23 and 24, respectively, such rollers being driven by beveled gears located at the side of the trough and connected with the main driving-shaft, each set being under the control of the operator, so that either section of the tube formed from the extra long tube may be fed forward into the finishing-rolls. The levers for operating the same, as well as the saw 21, may be located near the entrance end of the trough 16, so that the operator can at this point feed the tube into the sizing-rolls, operate the saw, and control the movement of the tubes in feeding to the finishing-rolls. The levers for such operation are illustrated diagrammatically at 27, Fig. 1. The bearings 28 support the swinging frame 30, in the free end of which is mounted a suitable arbor, to which is affixed the saw 31, which may be driven by a belt and which is under the control of the operator, so that when the tube is to be cut into sections the saw passes downwardly across the trough to operate upon the work.

In the use of the apparatus above described the blanks to be welded into tubing, which are shown as flat strips or plates 34, are each made of a length of about thirty-eight (38) feet, so that their product when cut into sections will yield two tubes each of the standard length of eighteen or eighteen and one-half (18 or $18\frac{1}{2}$) feet. The forward ends of the strips are trimmed and bent so as to provide raised tongued ends 35, adapted to pass over the bottom of the furnace, as fully described in my said Patent No. 581,251. For the rapid practice of the invention I generally arrange the furnace-bottom to receive six or more parallel processions of such strips at one time. The members of each procession of strips are successively fed into the furnace-chamber through the rear ports 5 to the position in which they are brought to a welding heat preparatory to being withdrawn from the front end of the furnace. The furnace is maintained at an extremely high welding heat and preferably is kept at practically an even heat throughout. The time for heating each strip in the furnace generally varies from three-fourths ($\frac{3}{4}$) of a minute to a minute and a half, ($1\frac{1}{2}$.) When the strip is at the proper temperature for welding—that is, when the operator sees that the liquor is running on the edges of the forward end of the strip—he grasps the forward end with a tongs which he introduces through the furnace-opening 36. The welding-bell is then slipped over the tongs and the tongs are connected to the draw-chain 9 of the draw-bench, by which the heated strip is drawn from the furnace and through the welding-bell. The edges of the strip being at a suitable welding heat are thus made to curve toward and abut against each other, and the strip is thereby welded into tubing. In this operation two causes operate to heat up the welding-bell—to wit, the friction or the transformation of the work done into heat, and, what is more important, the direct contact with the hot metal. Therefore in butt-welding double-length tubing it is desirable to increase the speed of the drawing mechanism in order to lessen the duration of the exposure of the bell to such contact, as described in my application filed May 14, 1901, Serial No. 60,138. As the tube is being drawn through the welding-bell it passes between the air-blast nozzles 14, and the air projected upon such welded portion cools it quickly and stiffens it sufficiently to prevent the undue stretching of the tube, even though the strip is of such great length that the welded tube would otherwise be more liable to stretch, because the point of drawing strain is removed so far from the point of welding within the welding-bell. The air-blast does not, however, lower the temperature below a rolling heat, and as soon as the strip has been welded throughout its length the operator disengages the tongs from the draw-bench and from the tube, which then rolls down into the trough 16. The operator then quickly pushes the tube forward into the sizing-rolls, which roll it to an even diameter throughout and deliver it into the trough 19. At the end of the trough 19 is a stop-plate 37, against which the tube strikes, and is thereby stopped in proper position for being sawed into sections. The operator then through the proper lever operates the saw 22, which cuts the extra long tube while it is resting in the trough 19 into two sections of tubing of standard length. The operator by means of the feed-rolls 25 and 26 then feeds the two sections of tubing in appropriate succession from the trough 19 into the finishing-rolls 30, which completes the operation. If the saw is located in the trough 16, the feed-rolls can be so arranged to carry forward the tube-sections formed from the long strips, not only through the sizing-rolls, but through the finishing-rolls. While the long tube is being sawed into said sections the crop ends thereof may also be sawed off, and for that purpose saws may be placed at the ends of the trough, as shown in dotted lines at 38 and 39, the crop ends dropping through openings in the trough while the tubes pass forward to be finished.

It will be perceived that in the normal operation of the apparatus herein described two standard lengths of tubing can be produced by a single charging, heating, and welding operation, thus reducing the labor of the chargers, the welders, and the other workmen, increasing the output of the plant at least one-half, and largely diminishing the quantity of scrap produced and fuel required, while provision is made to overcome the difficulties inherent in the welding of a great length of tube at one operation.

What I claim as my invention, and desire to secure by Letters Patent, is—

1. In apparatus for the manufacture of double-length tubing, the combination of a welding-furnace, drawing apparatus in front thereof, a receiving-trough at the side of the drawing apparatus and adapted to feed the tube to finishing-rolls, and a saw for severing the double-length tube adapted to pass across the receiving-trough.

2. In apparatus for the manufacture of double-length tubing, the combination of a welding-furnace, drawing apparatus in front thereof, sizing and cross rolls at the side of the drawing apparatus, a trough receiving the tube from the drawing apparatus in line with the sizing-rolls, a trough between the sizing and cross rolls and a saw for severing the double-length tube adapted to pass across one of the troughs.

3. In apparatus for the manufacture of double-length tubing, the combination of a welding-furnace, drawing apparatus in front thereof, a receiving-trough at the side of the drawing apparatus formed in two sections in line with each other and adapted to feed the tube to finishing-rolls, a saw for severing the double-length tube adapted to pass between the trough-sections, and power-driven rollers in each trough-section to feed forward the separate tube-sections to the finishing-rolls.

4. In apparatus for the manufacture of double-length tubing, the combination of a welding-furnace, drawing apparatus in front thereof, a receiving-trough at the side of the drawing apparatus formed in two sections in line with each other and adapted to feed the tube to finishing-rolls, a saw for severing the double-length tube adapted to pass between the trough-sections, and power-driven rollers in each trough-section to feed forward the separate tube-sections to the finishing-rolls, the power-driven rollers for each trough-section being separately controlled.

5. In apparatus for the manufacture of tubing, the combination of a welding-furnace, drawing apparatus in front thereof, and mechanism located back of the welding means adapted to project a cooling medium into the path of the welded tube.

6. In apparatus for the manufacture of tubing, the combination of a welding-furnace, drawing apparatus in front thereof, and air-jet mechanism located back of the welding means and adapted to project air into the path of the welded tube.

7. In apparatus for the manufacture of tubing, the combination of a welding-furnace, drawing apparatus in front thereof, and mechanism, supported on the drawing apparatus back of the welding means, adapted to project a cooling medium into the path of the welded tube.

8. In apparatus for the manufacture of tubing, the combination of a welding-furnace, drawing apparatus in front thereof, and jet-nozzles located back of the welding means and on each side of the path of the welded tube.

9. In apparatus for the manufacture of tubing, the combination of a welding-furnace, a swinging draw-bench in front thereof pivoted at its rear end, mechanism, supported on the draw-bench back of the welding means, adapted to project a cooling medium into the path of the welded tube, a supply-pipe extending longitudinally of the draw-bench, and a flexible supply-pipe connected thereto at the rear of the draw-bench.

In testimony whereof I, the said PETER PATTERSON, have hereunto set my hand.

PETER PATTERSON.

Witnesses:
JAMES I. KAY,
ROBERT C. TOTTEN.